March 10, 1959  H. C. HOLIDAY  2,876,922
BOAT-CARRYING TRAILER
Filed Sept. 15, 1955  3 Sheets-Sheet 1

Inventor
Harold C. Holiday,
by George H. Baldwin
His Attorney.

March 10, 1959
H. C. HOLIDAY
2,876,922
BOAT-CARRYING TRAILER
Filed Sept. 15, 1955
3 Sheets-Sheet 2
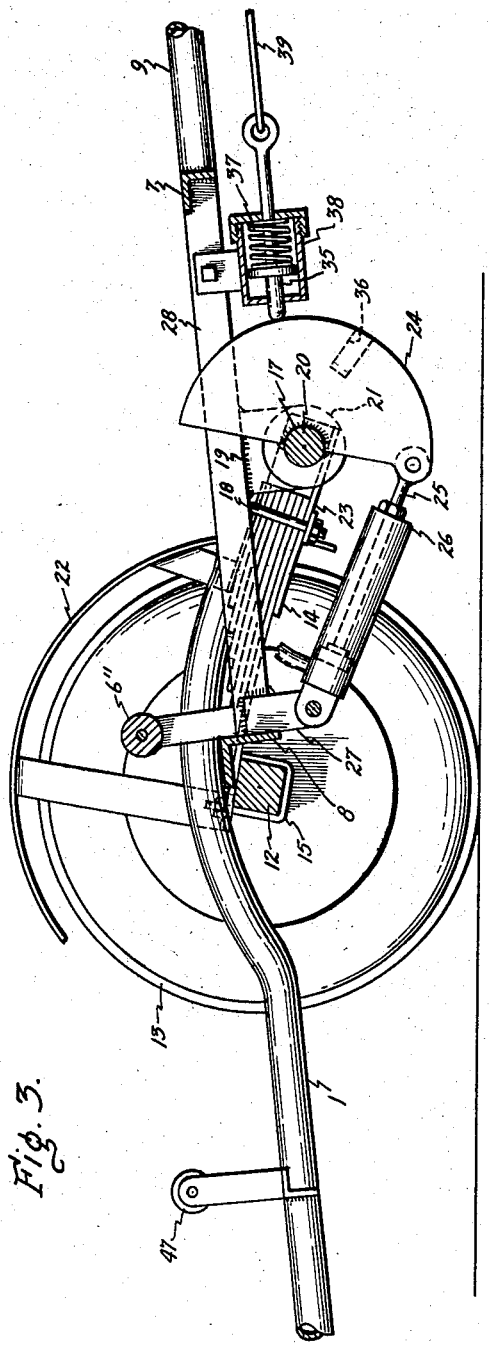
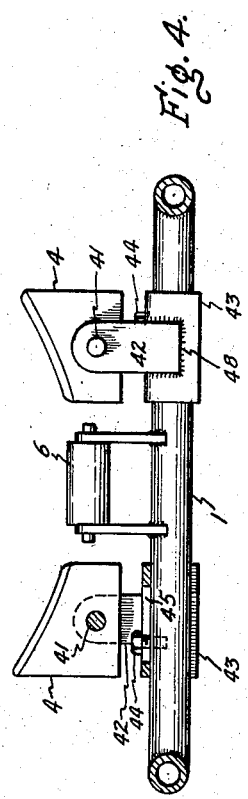
Inventor
Harold C. Holiday
by George H. Baldwin
His Attorney.

March 10, 1959 — H. C. HOLIDAY — 2,876,922
BOAT-CARRYING TRAILER
Filed Sept. 15, 1955 — 3 Sheets-Sheet 3

Inventor
Harold C. Holiday,
by George H. Baldwin
His Attorney.

United States Patent Office 2,876,922
Patented Mar. 10, 1959

2,876,922

BOAT-CARRYING TRAILER

Harold C. Holiday, Jacksonville, Fla., assignor of one-half to Alton N. Parker, Jacksonville, Fla.

Application September 15, 1955, Serial No. 534,527

8 Claims. (Cl. 214—506)

My invention is in the field of highway trailers, particularly for use in transporting small boats. Among its purposes and advantages are to provide an improved connection between the bed and running gear of the trailer, whereby the bed may be simultaneously lowered and tilted for loading and unloading, may be moved without shock between travel and loading positions, and may be raised from loading to travel position by easily-operated means giving such a large mechanical advantage that no great strength is needed by the operator. Further, my invention provides safety locking arrangements independent of the bed-raising means to hold the bed, whether loaded or not, in travel position. Additional advantages are a simple, accessible, and easy-riding spring suspension of the bed upon the running gear; and an improved chocking arrangement. A further advantage is provided in a modified construction, wherein means are associated with the bed-raising means to raise the boat off of its chocks and onto rollers to permit ready loading and unloading of the boat on the trailer.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Fig. 3 is an enlarged detail view showing the principal parts in loading position, on the same plane as Fig. 1;

Fig. 4 is a transverse elevation of my improved chock, taken along line 4—4 of Fig. 1, with some parts in section;

Figure 1:
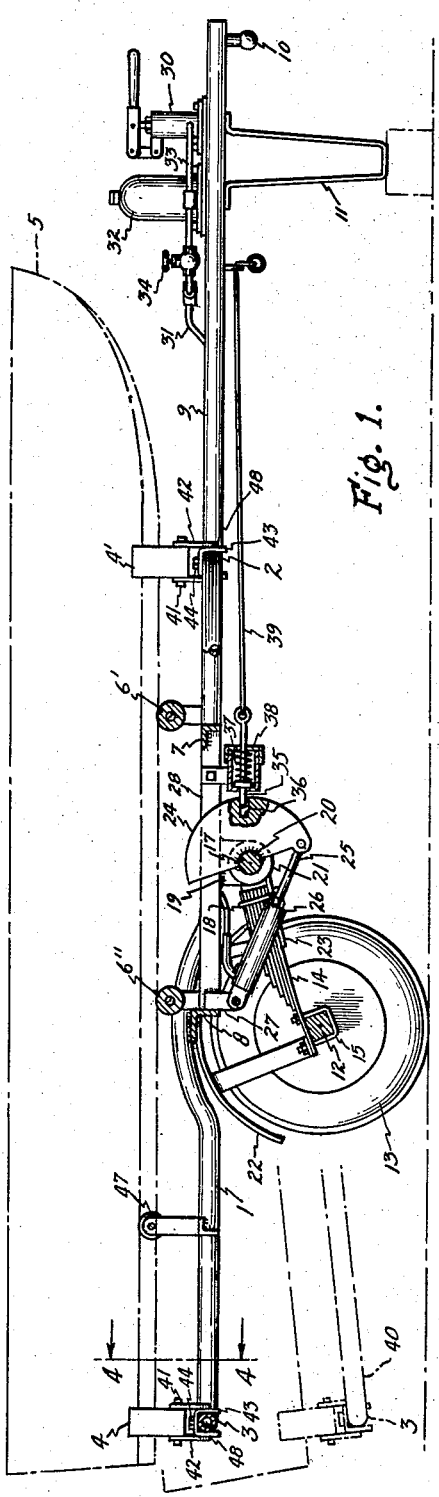
Fig. 1 is an approximately central longitudinal elevation, with a few parts in section, as indicated by line and arrows 1—1 of Fig. 2, including broken line elevations of the boat in travel position and of the rear ends only of trailer and boat in position to load or unload.

The preferred embodiment of my trailer comprises a bedframe 1, here shown as made of tubing, with transverse end members 2 and 3 equipped with chocks 4 to support a boat 5 in travel, and rollers 6, 6' and 6" for loading, launching and keel support. Additional cross-bars 7 and 8 stiffen the frame, the bar 8 being placed where the raising and lowering force is applied to the bed frame. The front end of a tongue 9 carries a hitch coupling 10, a depending leg 11, and various elements of the raising and lowering mechanism hereafter described. The running gear of the trailer includes a non-rotating axle 12 with road wheels 13 journalled thereon at either end and with a respective laminated leaf spring 14 affixed thereto by means of a U-bolt or clamp device 15 at the sides of the trailer frame. The thin rear end of the spring being fastened to the axle 12 by U-bolt 15, its thick forward end is rigidly attached by a structure hereafter described to the end of a rotatable cross-shaft 20 carried in pillow-block bearings 21 welded at 19 to the underside of the bed frame 1. The springs 14 are the sole connections between the bed frame 1 and the axle 5 and provide substantially the whole weight support for the frame. Mud guards 22 protect the boat against spatter from the road.

The shaft 20 is connected to each spring 14 by an angle iron 23 welded on the end of the shaft and extending rearwardly far enough to form a seat whereon the butt of the spring is held by U-clips or U-bolts 18. A rigid half-disk 24 is fixedly secured by a weld 17 to the middle of the shaft 20.

The free end of a piston rod 25 is pivoted to the lower corner of the half-disk 24. This rod works in a cylinder 26, pivoted at its base to a lug 27 welded both to the cross-bar 8 and to longitudinal stiffeners 28 of the bed frame 1, as best seen in Fig. 3. Thus the cylinder and rod constitute an extensible link which raises the bed frame 1 from the loading and unloading position of Fig. 3 to the travel position of Fig. 1 when the piston rod 25 is forced out by pumping liquid into the cylinder 26 by a hand pump 30 through a tube 31 from a reservoir 32. Tube 33 communicates between reservoir 32 and pump 30. The pump and reservoir are mounted near the front of the tongue 9, conveniently accessible, but out of the way of the boat 5. It will be noted that the system is in effect a hydraulic jack for raising the bed frame on the axle 12. The elevating mechanism can be locked positively in the upper, travel, position by a detent pin 35 entered into a hole or recess 36 in the half-disk 24 by action of a spring 37 within a housing 38 beneath the bed frame 1. A slant slightly down from a true radius as the hole goes out increases the pressure on the pin, affording further safeguard against the pin working out while the trailer bounces over the road. A pull cord or rod 39 enables the operator standing near the pump 30 to release the pin. When this is done, and when a valve 34 which connects between line 31 and the reservoir is opened, the piston retracts, hydraulic fluid being returned through line 31 and valve 34 into the reservoir, shortening the link, and the cross-shaft 20 rotates in its pillow-block bearings 21 and the springs 14 rigidly affixed thereto rotate therewith, whereby the bed frame 1 is eased down from the full line position of Fig. 1 onto the axle 5 and into the position indicated by broken lines at 40, and also as indicated in the detail view of Fig. 3, the liquid flowing gradually into the reservoir 32 as controlled by the opening of valve 34. Accordingly, springs 14 function as road wheel support arms pivoted to the frame by shaft 20, and, in pivoting with respect to the frame, these arms raise and lower the frame with respect to the wheels. Either the leg 11 or an automobile connected at coupling 10, as the case may be, constrains the bed frame to tilt backward.

Figure 2:
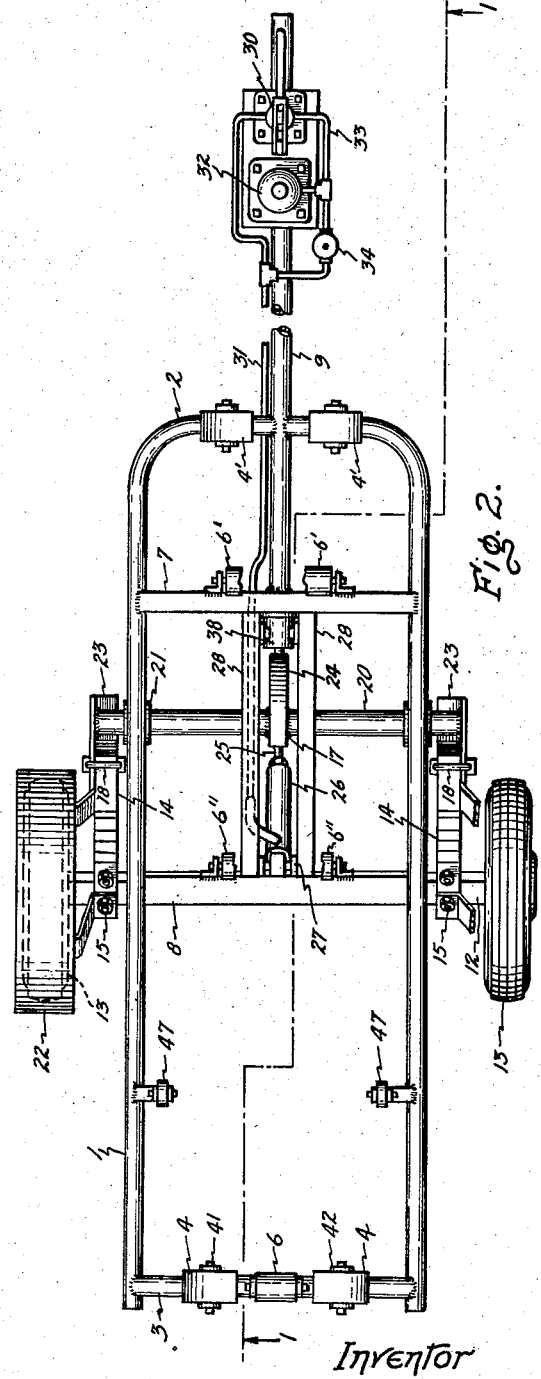
Fig. 2 is a plan of my trailer, with some parts broken away.

As best shown in Fig. 4, but also seen in Figs. 1 and 2, the bed frame end members 3 and 2 each carry a pair of self-adjusting chocks or cradles 4 and 4' respectively, supported individually as upon a respective pin 41 between upstanding ears 42 welded at 48 to the sides of an inverted channel member 43 which fits over the frame tubing 3 or 2. A bolt 44 extends through a slot 45 along the channel 43 and threads into the tubing 2 or 3, so that by loosening the bolt the channel may be adjusted inward or outward. Turning of the chock 4 on the pin 41 allows it to adjust to the shape of the boat. When loading or launching the boat rides on rollers 6 between the chocks and wheels 47 upstanding from the sides of the bed frame 1 near the rear. While chocks 4 steady the boat hull and may carry an appreciable or even a substantial portion of the boat weight, at least the major portion or substantially all of the boat weight is borne by rollers 6 engaging the keel of the boat. The rollers 6 are preferably of wood or metal carrying a surface layer of relatively firm rubber or the like, soft enough to avoid marring or scuffing of the keel, yet hard enough to provide good support.

Since the boat weight is mainly supported by rollers 6, the boat may be readily pulled into position on the frame, or rolled therefrom. It will be understood that chocks 4 at or adjacent the stern of the boat are adjusted inwardly to fit snugly against the boat hull, such adjustment being permitted by bolts 44 and slot 45, and that chocks 4' are similarly adjusted along member 2 to fit snugly against the hull at a forward portion thereof, generally toward or adjacent the bow of the boat.

Figure 5:
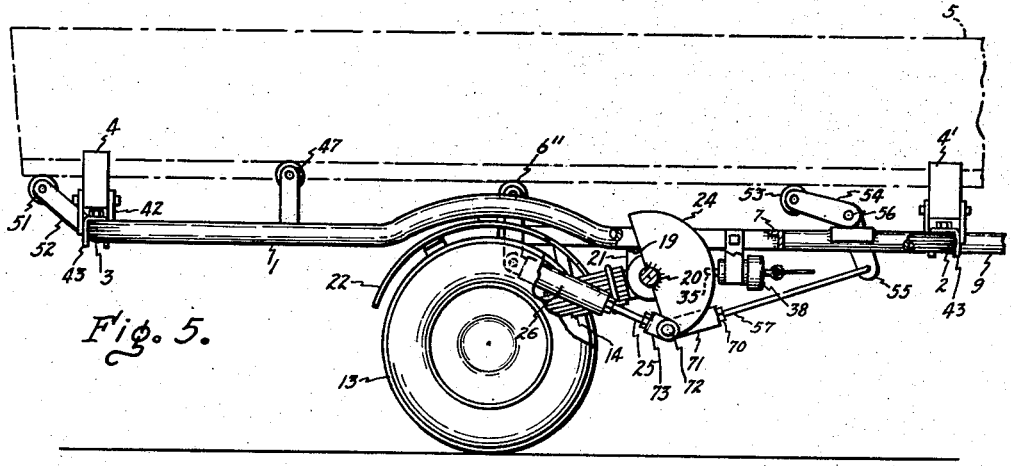
Fig. 5 is a detail side view of a portion of a trailer, certain parts being broken away, in accord with a modified construction, the trailer bed and boat being in travel position.
Figure 6:
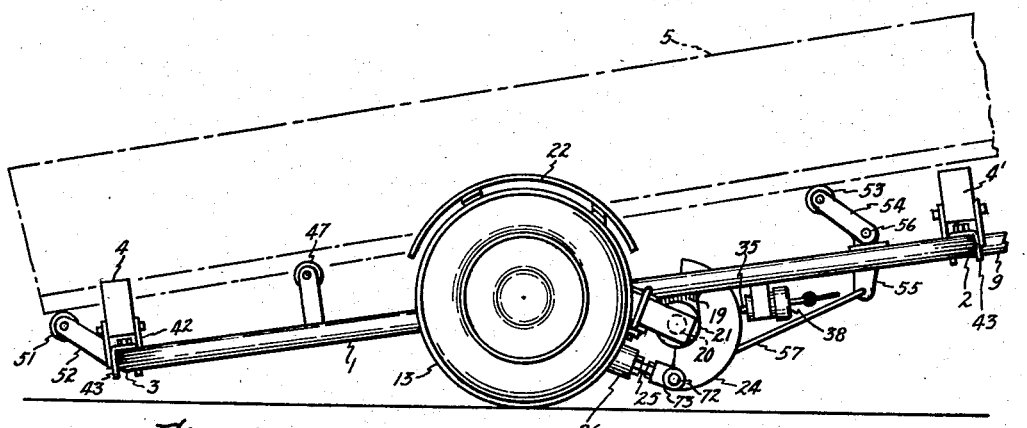
Fig. 6 is a side view of the modified trailer of Fig. 5 showing the bed and boat in position for loading or unloading the boat.
Figure 7:
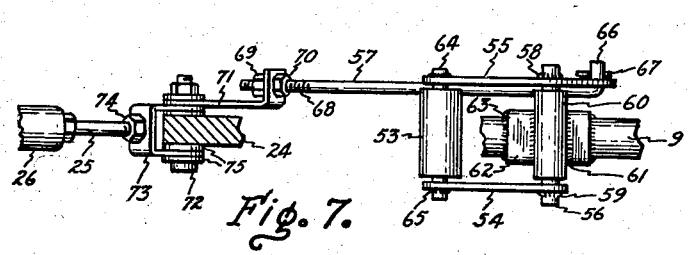
Fig. 7 is an enlarged detail top view, partially broken away and in section, of a portion of the raising and lowering mechanism employed in the modification of Figs. 5 and 6.

Figs. 5, 6 and 7 show a modification of the trailer described hereinabove, in which most of the parts are in accord with corresponding parts in the previously described construction. Such parts of the modified embodiment as correspond in function, position and construction to parts in the first embodiment shown are similarly numbered in Figs. 5, 6 and 7 and it will be understood that the description of such parts heretofore given in connection with Figs. 1 through 4 is equally applicable to the correspondingly numbered parts of the modified construction.

Referring to Figs. 5 and 6, the bed or frame 1 carries stern chocks 4, bow chocks 4', stationary keel roller 6" and stationary chine rollers 47. The bedframe 1 is welded at 19 to bearings 21 in which shaft 20 is disposed for rotation through an arc of several degrees. Springs 14 are rigidly connected at their forward ends to shaft 20, and are connected at their rearward ends to an axle for wheels 13. Half-disk 24 is affixed to shaft 20 and provides a downwardly extending arm to the lower end of which is pivoted one of the two relatively movable members 25 of the expansible chamber device which includes, as the other of the two relatively movable members, cylinder 26. Spring loaded detent pin 35 cooperates with disk 24 to retain the bed during travel in its raised or travel position shown in Fig. 5, all as hereinbefore described in connection with Figs. 1 through 4. In this modification, the hydraulic system of Figs. 1 through 4 is employed, though omitted from the drawings to avoid repetition.

A stern keel roller 51, in the modified arrangement, is supported by lugs 52 fast to the bedframe in position to engage the keel of boat 5 aft of chocks 4. Keel roller 53 is provided in a position to engage the boat keel near the middle, fore and aft, and preferably somewhat forward of the middle but spaced aft from the bow. Roller 53 is mounted for free axial rotation between the upper ends of a pair of movable spaced arms 54 and 55. The roller support arms 54 and 55 are pivotally attached to the bedframe. As shown, a shaft 56 is affixed to the arms, at opposite ends of the shaft, and affords a generally horizontal pivot axis for the arms, permitting the arms to swing or pivot with respect to the frame. The lower end of at least arm 55 extends below shaft 56 and a cable or rod 57 is pivotally attached to the lower end of arm 55. The rod 57 is attached at its other end, remote from arm 55, to the piston rod 25 of the expansible chamber device, whereby, when the fluid is permitted to escape from cylinder 26, piston rod 25 moves in a direction to pull coupling rod 57, and this pull, being transmitted to the lower end of arm 55, tends to rotate arms 54 and 55 about the axis of shaft 56 from the position shown in Fig. 5 to the position shown in Fig. 6.

Details of the arrangement associated with roller 53 are best seen in Fig. 7, wherein shaft 56 is seen to be welded, as at 58 and 59, to the arms 54 and 55, and the shaft 56 is seen to be disposed in a bearing sleeve 60. Sleeve 60, in turn, is welded at 61 to a plate 62, and plate 62 is welded at 63 to tongue member 9 of the bedframe. Roller 53 is free to rotate about the axis of its mounting shaft 64. The shaft 64 may be affixed at its ends, as by welds 65, to the arms 54 and 55, and the roller 53 may rotate on the shaft, or the shaft may be rotatably carried by the arms and fixed to the roller 53, dependent upon bracing requirements to hold the arms 54 and 55 in correct alignment.

The forward end 66 of rod 57 is bent over at a right angle and passes through the lower end of arm 55, being held in place by cotter pin 67, thereby to provide a simple pivotal connection between arm 55 and rod 57. The other rearward end of connecting rod 57 has threads 68 and carries a pair of nuts 69, 70, arranged to anchor a strap or coupling member 71 adjustably to rod 57. Strap 71 is conveniently connected to piston rod 25 by being bolted by bolt 72 to yoke 73, yoke 73 being connected and locked by nut 74 to the forward end of the piston rod. Bolt 72 serves as the pivotal connection between piston rod 25 and half-disk 24, and it will be understood that yoke 74, strap 71 and disk 24 may each pivot freely about bolt 72. Suitable washers 75 are preferably provided on bolt 72 to permit pivoting with respect to one another of the several members engaged on the bolt.

The linkage system, comprising, as seen in Fig. 5, piston rod 25, yoke 73, pin 72, half disk 24, coupling 71, link 57, and shaft 20, couples the roller support arm 55 to the hydraulic motor for operation thereby and further, couples the wheel support arms 14 into the linkage system for swinging of the wheel support arms 14 by the motor simultaneously with the swinging of the roller support arm 55.

Depending upon the relations between the weights of the boat and of the bedframe, the lengths of the arm 55 above and below its pivot shaft 56, the lengths of the lever arms in the L-shaped lever system effective about shaft 20 as measured respectively from shaft 20 to the coupling between disk 24 and piston rod 25 and from shaft 20 to the axis of wheels 13, and the fore-and-aft location of roller 53, the force which it is necessary to apply through piston 25 and cylinder 26 to effectuate raising of the bedframe may be in this modification considerably reduced from that necessary in the first described embodiment. The weights, dimensions and positions of the parts are such that the weight of the boat on roller 51 and the weight of the boat and bedframe supported on shaft 20 and through springs 14 are sufficient, upon relief of pressure in cylinder 26, to rotate arms 54 and 55 in the direction to raise the roller 53 with respect to the frame and thereby to lift the boat from chocks 4 and 4' and from chine rollers 47, whereby the whole weight of the boat is upon rollers 51 and 53.

In operation, then, relief of cylinder pressure permits shaft 20 to rotate from the position of Fig. 5 to the position of Fig. 6, lowering the bedframe into launching or loading position. Simultaneously with the lowering of the bedframe, arms 54 and 55 are forced, by the pull on rod 57, to rotate about the axis of shaft 56 thereby to raise roller 53 with respect to the bedframe and to lift the boat from its chocks. With the frame lowered as in Fig. 6, the boat 5 may be rolled on or off the trailer without dragging on the chocks. In the usual instance, the stern of the boat will be floatingly supported in the water, and therefore will not bear on chocks 4, when the bow is not supported by roller 53, but the forward end of the keel will then be supported by roller 6". With the boat further in the water, the bow is supported by stern roller 51.

When the bedframe is to be raised, with boat 5 in position, from the position of Fig. 6 to the traveling position of Fig. 5, substantial weight is supported on roller 53 reflected in a substantial forward pull on coupling rod 57. The forward force on rod 57, it will be seen, assists the generally forward motion of piston rod 25, whereby less hydraulic pressure in cylinder 26 is required to force piston rod 25 in the direction to rotate shaft 20 from the Fig. 6 to the Fig. 5 position.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A boat trailer comprising a bed, a transverse non-rotating axle therebelow, road wheels rotatable on said axle, a shaft across said bed parallel to and above and forward of said axle, bearings for said shaft beneath said bed on each side, a half-disk extending outwardly from and affixed to said shaft and having a diametral edge, leaf springs on each side of said bed each rigidly connected at one end to said axle and rigidly connected at the other end to said shaft, and a link of variable length pivoted at one end to and below said bed and at the other end to said half-disk adjacent said edge thereof and remote from said shaft, whereby change in length of said link swings said spring and said axle as a unit about the axis of said shaft and alters the height of said bed.

2. The apparatus of claim 1, wherein a generally radially directed recess is formed in the circumferential edge of said half-disk, and a locking pin carried by said bed disposed to ride upon said edge and selectively to engage in said recess.

3. The apparatus of claim 1, wherein a generally radially directed recess is formed in the circumferential edge of said half-disk, said recess being slanted slightly downward from the inside with respect to a true radius, and a locking pin carried by said bed disposed to ride upon said edge and selectively to engage in said recess, with the upper rim of said recess bearing against the side of the pin.

4. A boat trailer comprising a bed, a transverse axle therebelow, a respective road wheel on each end of said axle adjacent each respective side of said bedframe, a transverse shaft beneath said bed forward of said axle, bearings for said shaft secured to opposite sides of said bed, an arm fast to said shaft, leaf springs on either side of said bed each connected at one end to said axle and rigidly connected at the other end to said shaft, and an extensible hydraulic cylinder and piston device having a portion pivoted to said bed and a relatively movable portion pivoted to said arm at a point remote from said shaft, whereby the rotative position of said shaft in said bearings is controlled by said device, manual pump and valve means on said bed operatively connected to said device, a boat support roller, an arm pivoted to said bed and carrying said roller spaced from said pivot, and means coupling said arm to said relatively movable portion of said device and responsive to movement thereof to raise and lower said roller.

5. A boat trailer comprising a bed, an axle transverse thereto, road wheels thereon, leaf springs on each side of said bed, each pivotally attached at one end to said bed and rigidly connected at the other end to said axle, and means for tilting said springs with respect to said bed about the axis of said pivotal attachment to raise and lower said bed with respect to said axle, said means comprising an extensible hydraulic cylinder and piston device coupled to said bed and shaft and remote operating means for said device, a roller for engaging the bottom of a boat on said trailer, a supporting arm rotatably carrying said roller at one end of said arm, said arm being pivotally connected at a portion spaced from said roller to said bed, and a link connecting between a second portion of said arm spaced from said pivotal connection thereof and said device and adapted and arranged to pivot said arm in a direction to raise said roller with respect to said bed in response to operation of said device in the direction to lower said bed with respect to said axle.

6. A boat trailer comprising a bed, a transverse axle therebelow, road wheels on said axle, a transverse member beneath said bed forward of said axle, a bearing attached to said bed, said member having a journal portion in said bearing and being rotatably supported therein, a spring arm connected at opposite ends to said axle and shaft and being rotatable with said shaft to raise and lower said bed on said axle, a boat-keel-engageable roller, an arm mounting said roller pivotally attached to said bed to swing said roller in an upward and downward arc, a bed raising and lowering arm affixed to said member and extending laterally therefrom, said arms being disposed substantially along the center line of said bed and spaced rearwardly from the forward central end portion thereof, manually controlled remote operating means attached to said forward central end portion, and cooperating force transmitting means extending along said center line from said operating means to each said arm, said operating and transmitting means being operable to swing said arms respectively to raise and lower said roller and to lower and raise said bed on said axle.

7. The apparatus of claim 6, wherein said trailer carries bow chocks adjacent its forward end, stern chocks adjacent its rear end and a stern keel roller aft of said stern chocks, and the pivotally mounted boat-keel-engageable roller is disposed to contact a boat keel forwardly of the center of gravity of a boat being carried and being swingable in its arc to raise said boat from said chocks on said rollers.

8. In a boat trailer comprising a bed having boat support means thereon, road wheels, transverse axle means carrying said wheels rotatably thereon, suspension means having a first portion joined to said axle means and having a second portion spaced from said first portion pivotally connected to said bed, whereby pivoting of said means on said bed raises and lowers said bed with respect to said wheels, a boat hull engageable roller, a roller support member pivotally connected to said bed and freely rotatably carrying said roller at a point spaced from said pivotal connection, said member having a pivotal position in which said roller is disposed above said bed and said member being pivotal about its said connection to lower said roller with respect to said bed, said means having a point thereon spaced from its pivot axis, and a link joined to said means at said point thereof, whereby said link moves in a predetermined direction upon said lowering of said bed with respect to said wheels, said link being connected to a point on said member selected to cause said member to pivot in a direction to raise said roller in response to movement of said link in said predetermined direction, whereby the weight of the boat on said roller at least partially balances the weight of the boat on the bed.

References Cited in the file of this patent

UNITED STATES PATENTS

| | | |
|---|---|---|
| 2,286,576 | Ronning | June 16, 1942 |
| 2,487,701 | Getz | Nov. 8, 1949 |
| 2,586,485 | Schroeder | Feb. 19, 1952 |
| 2,608,314 | Krider | Aug. 26, 1952 |
| 2,609,953 | Schramm | Sept. 9, 1952 |
| 2,636,745 | Cartwright | Apr. 28, 1953 |
| 2,706,009 | Schramm | Apr. 12, 1955 |
| 2,723,038 | Peterson et al. | Nov. 8, 1955 |
| 2,733,823 | Evans | Feb. 7, 1956 |
| 2,765,941 | Mamo | Oct. 9, 1956 |
| 2,788,908 | Lynd | Apr. 16, 1957 |